Feb. 7, 1928.  
E. A. HARDISON  
1,658,288  
INTERNAL EXPANDING BRAKE  
Filed Dec. 24, 1925 2 Sheets-Sheet 2

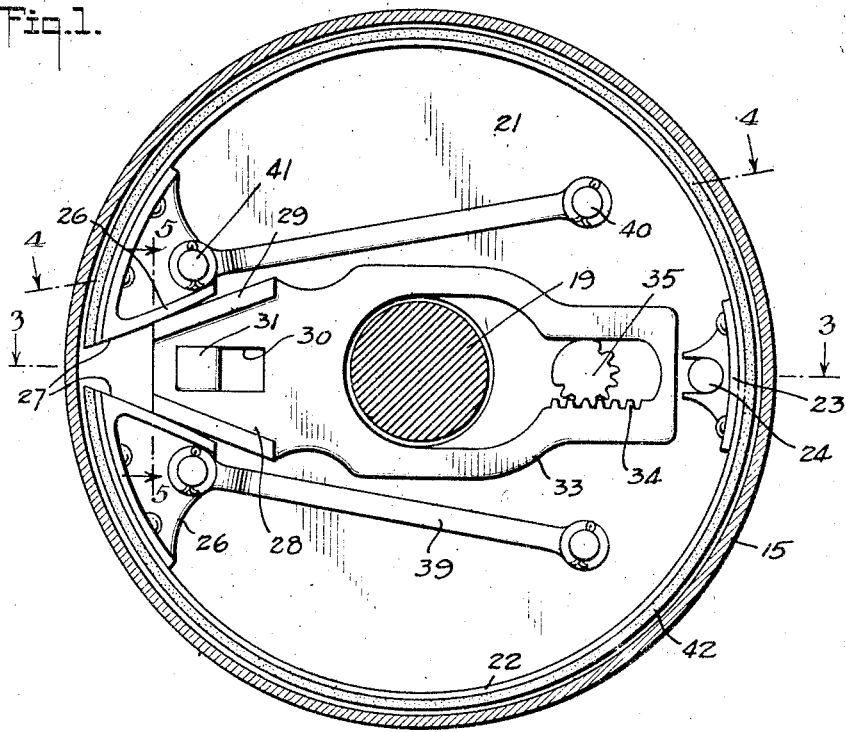

INVENTOR.  
EDWIN A. HARDISON  
BY *Munn & Co.*  
ATTORNEYS.

Patented Feb. 7, 1928.

1,658,288

UNITED STATES PATENT OFFICE.

EDWIN A. HARDISON, OF LOS ANGELES, CALIFORNIA, ASSIGNOR OF ONE-FOURTH TO HARRY M. MILLER AND ONE-FOURTH TO ERVIN D. STUART, BOTH OF SANTA PAULA, CALIFORNIA.

INTERNAL-EXPANDING BRAKE.

Application filed December 24, 1925. Serial No. 77,534.

My invention relates to internal expanding brakes particularly adapted, although not necessarily, for motor vehicles.

A purpose of my invention is to provide an internal expanding brake in which the band is capable of being expanded uniformly from end to end so as to have uniform braking engagement with the brake drum and to thereby effect maximum braking action with minimum effort and a uniform wearing of the brake liner.

It is also a purpose of my invention to provide a brake of the above described character which is extremely simple and inexpensive to manufacture and assemble, and a brake in which the mechanism for actuating the brake band can be operated with minimum effort and the band easily maintained in fully expanded position.

I will describe only one form of internal expanding brake embodying my invention, and will then point out the novel features thereof in claims.

In the drawings:

Figures 1 and 2 are views showing in side elevation one form of brake embodying my invention, and the brake being shown in released and applied position, respectively, in Figures 1 and 2;

Similar reference characters refer to similar parts in each of the views of the drawing.

Figure 3:
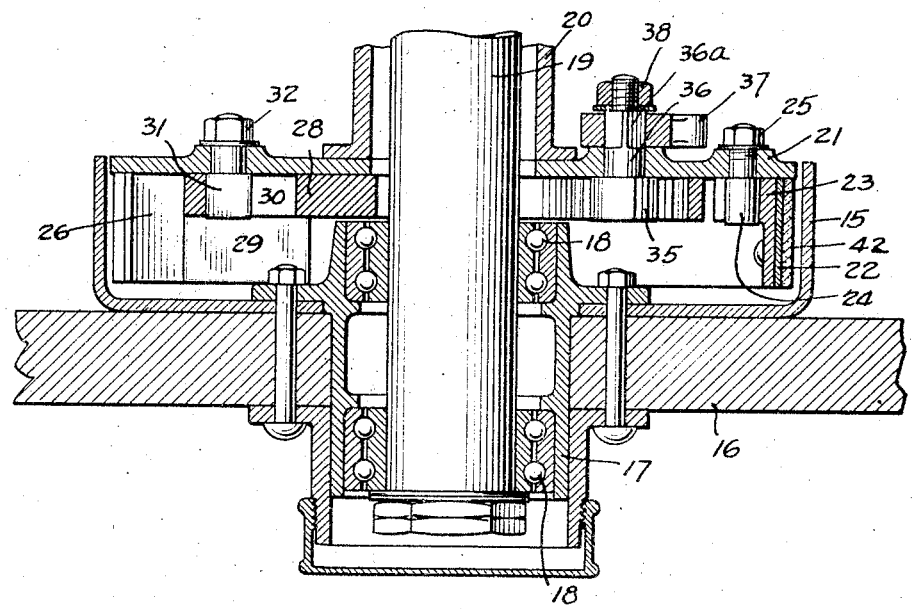
Figure 3 is a sectional view taken on the line 3—3 of Figure 1.
Figure 4:
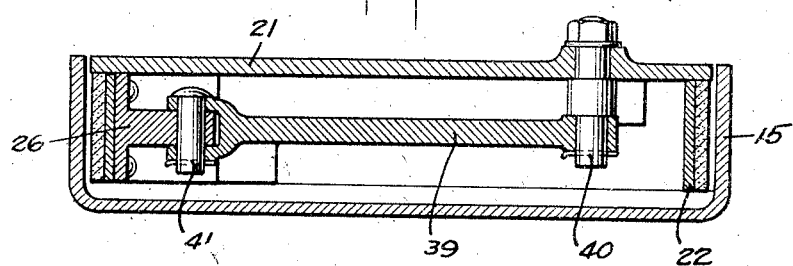
Figure 4 is a sectional view taken on the line 4—4 of Figure 1.
Figure 5:
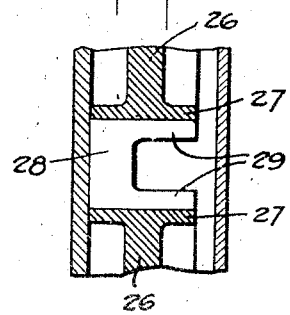
Figure 5 is a fragmentary sectional view taken on the line 5—5 of Figure 1.

Referring specifically to the drawing, my invention in its present embodiment comprises a brake drum 15 of conventional form secured to a vehicle wheel 16 having a hub 17 provided with bearings 18 in which an axle 19 is journaled. The axle 19 may constitute the rear or driving axle of a motor vehicle, and as shown is projected from a housing 20 to which latter is secured a disk 21 carrying the brake mechanism.

The brake mechanism comprises a band 22 formed of resilient metal, such as steel or the like, and normally concentric within the drum 15, with its medial portion provided with a guiding bracket 23 slidably engaging a guiding pin 24 mounted in the disk 21 and secured therein by means of a nut 25. The free ends of the band 22 have secured thereto a pair of companion block members 26, the confronting sides of which are constructed to form converging surfaces 27. These surfaces co-operate to provide a wedge shaped opening into which is extended an expanding member 28 having converging surfaces 29 to form a wedge. This wedge 28 is mounted for movement so as to have expanding engagement with the block members 26, and to this end the wedge is provided with a slot 30 into which extends a pin 31 which operates to positively guide the wedge in its horizontal movement and to also limit the movement of the wedge in either direction. The pin is secured in the disk 21 by means of a nut 32.

The wedge or expanding member 28 is shown as formed integral with a yoke 33 constructed to accommodate the axle 19 and yet allow of the necessary movement of the expanding member without the yoke engaging the axle. The yoke 33 is constructed with teeth 34 to form a rack which is constantly engaged by a pinion 35 formed on the inner end of a stub axle 36 having an angular portion 36ª on which latter is secured an operating arm 37, by means of a nut 38. This operating arm 37 is adapted to be connected through any suitable mechanism (not shown) with the brake pedal of a motor vehicle so that by depression of the latter the arm will be actuated to rotate the stub shaft 36 and through the medium of the rack 34 to actuate the yoke and hence the expanding member 28.

A pair of links 39 are pivotally mounted on studs 40 secured to the disk 21 at opposite sides of the yoke 33, and these links are also pivotally connected by means of studs 41 to the companion block members 26. These links 39 are designed to control the expanding movement of the block members 26 and hence the expanding movement of the band 22, which latter carries the usual liner 42.

In the operation of the brake, the several parts occupy the positions shown in Figure 1 when the brake is in released position, the expanding member 28 being partly withdrawn from between the block members 26 so that the brake band 22 is substantially concentric to and out of engagement with the inner periphery of the drum 24. To apply the brake the operating arm 37 is actuated to advance the yoke 33 from the position shown in Figure 1 to that shown in Figure 2, whereby the expanding member 28 is moved inwardly between the block members 26, thereby starting the latter so as to cause an outward movement of the ends of the brake band. During this movement of the block members the links 39, because of their mounting and connection with the block members, so control the movement of the latter as to effect an expansion of the brake band uniformly from end to end, the intermediate portion of the band being supported in its outward or expanding movement by the guiding bracket pin. With the band expanded uniformly as described, it will be manifest that the liner 42 engages the drum 24 with uniform pressure throughout its entire length, thereby securing maximum braking action.

To release the brake, it is only necessary to move the lever 37 in the opposite direction to effect a retraction or rearward movement of the expanding member 28 when the block members 26, under the inherent contracting action of the brake band are returned to normal position, and the liner will, as a result, disengage the brake drum. It is to be particularly noted that the surfaces 27 of the block members 26 are slightly curved or rounded longitudinally so as to insure of the proper sliding engagement of the expanding member with the block members and in a manner to prevent possible binding of the two.

Although I have herein shown and described only one form of internal expanding brake embodying my invention, it is to be understood that various changes and modifications may be made therein without departing from the spirit of the invention, and the spirit and scope of the appended claims.

I claim:

1. A brake comprising a drum, a stationary disk, a resilient band within the drum, a bracket and pin supporting the intermediate portion of the band for movement, companion block members secured to the ends of the band and having converging surfaces, links pivotally connected to the bock members and to said disk, an expanding member of wedge form engaging the converging surfaces of the block members, a pin and slot connection between the disk and the expanding member for guiding the latter in its movement, a yoke secured to the expanding member, a rack on the yoke, and a pinion rotatably mounted in the disk and engaging the rack.

2. A brake comprising a drum, a band of flexible material within the drum and normally disengaging the latter, companion wedge members carried by the band, an expanding wedge member movable between the first members, and means for actuating the expanding member to cause the first member to expand said band and comprising a yoke connected to the expanding member, a rack on the yoke, and a rotatable pinion engaging the rack.

3. A brake comprising a drum, a band of flexible material within the drum and normally disengaging the latter, companion wedge members carried by the band, an expanding wedge member movable between the first members, means for actuating the expanding member to cause the first member to expand said band and comprising a yoke connected to the expanding member, a rack on the yoke, and a rotatable pinion engaging the rack, and means associated with the first members to control the movement thereof when expanded by the expanding member to cause expansion of the band uniformly from end to end.

4. A brake comprising a drum, a band of flexible material within the drum and normally disengaging the latter, companion wedge members carried by the band, an expanding wedge member movably mounted between the first members, and rack and gear means for actuating the expanding member to cause the first members to pand said band.

EDWIN A. HARDISON.